PREPARATION OF POLYMERS OF LACTAMS WITH REDUCED CRYSTALLINITY

This invention is concerned with a method for the preparation of lactam polymers which have reduced crystallinity.

The macromolecules of lactam polymers with regularly distributed amide groups can be arranged in crystalline regions. The polymers concerned are, e.g., polylactams such as Nylon 12 (polylaurinlactam), Nylon 7 (polyenantholactam), Nylon 6 (polycaprolactam), and Nylon 4 (polypyrrolidon). The crystallinity determines a whole series of properties of these polyamides and is one of the reasons for their high strength. In some polymerization processes (e.g., in the adiabatic polymerization of caprolactam according to Czechoslovak Pat. No. 97,333), a polymer with extremely high crystallinity is obtained. The crystallinity of polymers thus prepared is about 60 percent as compared to the polymers prepared by extruding, the crystallinity of which varies around 40 percent. These crystallinity values (40–60 percent) represent practical lower limits which can be achieved on the industrial scale. Lower crystallinity can be achieved in thin articles by a rapid cooling of the polymer melt; however, the state thus achieved is not stable. On heating the polymer above the glass transition temperature or in contact with the air humidity, crystallization begins to occur at temperatures above 0° C, and a value of about 40 percent is gradually reached, e.g., for polycaprolactam.

In some applications, however, it is desirable to reduce the crystallinity of polyamides permanently. Non-crystalline polymers are, e.g., transparent, and polyamides with reduced crystallinity have a much higher impact strength than highly crystalline ones. Great efforts have, therefore, been spent to reduce the crystallinity of some types of polyamides. The effect required can be achieved, e.g., by introducing irregularities in the homogeneous polymeric chain. In most polymers, reduced crystallinity is achieved by copolymerization with a suitable monomer. Thus, e.g., the crystallinity of polycaprolactam is reduced by copolymerization with some of the isomers of C-methylcaprolactam, or with a mixture of these isomers (e.g., according the Czechoslovak Pat. No. 102,488). The required degree of crystallinity is, in this case, regulated by the amount and type of the isomer of C-methylcaprolactam. However, the disadvantage of the described method of reducing crystallinity is a higher content of extractable low-molecular compounds in the polymer formed (mixture of monomers and cyclic oligomers).

This effect is undesirable and can be removed by using the proposed invention of preparation of polymers with reduced crystallinity via anionic polymerization, characterized by the introduction in the reaction mixture salts of polyvalent cations, these cations being $Ba^{2+}$, $Mn^{2+}$, $Mn^{4+}$, $Co^{2+}$, $Co^{3+}$, $Cd^{2+}$, $Cr^{3+}$, $Al^{3+}$, $Fe^{2+}$, $Fe^{3+}$, in an amount of from 0.05 to 10 percent, preferably about 1 molecule percent based upon the lactam. The salts of these cations can be introduced into the starting reaction mixture by stirring them in at an arbitrary step of the preparation of the polymerization mixture. For this purpose, salts soluble in the starting reaction components can be used advantageously. This can be achieved by choosing suitable types of salts (or by choosing suitable anions). In choosing the salts, it should be borne in mind that the salt used ought to be reasonably heat-stable so that acetates, chlorates, iodates, and permanganates are not very suitable. On the other hand, salts with stable anions, such as chlorides, fluorides, bromides, sulfates, as well as salts with organic anions, are suitable.

As can be seen from the examples given, the use of a suitable type of salt allows the preparation of a polymer of the same molecular weight as it would have without the salt, but with reduced crystallinity and, consequently, with increased transparency and toughness and reduced hardness. The polymer is further characterized by increased degradation resistance.

EXAMPLE 1

In 113 g of dry caprolactam, 4 g of sodium caprolactam and 1.3 g of chromium chloride are dissolved. The solution thus obtained is heated during 3 hours to a temperature of 200° C. and then left to cool. The transparent greenish polymer thus obtained contains 8 percent of extractable compounds (equilibrium value), and its polymerization degree is 530. On melting and cooling to room temperature at a rate of 1° C. per minute, the crystallinity of the polymer was 22 percent. The crystallinity of the polymer prepared in a similar manner but without salt addition was 45 percent. The crystallinity was determined in this and the other examples by standard infrared techniques.

EXAMPLE 2

At a temperature of 80° C., 0.83 g of anhydrous magnesium perchlorate, 0.060 g of sodium caprylolactam and 0.090 g of N-benzoylcaprylolactam are dissolved in 15.7 g of caprylolactam. The reaction mixture is then heated in ampoules 8 mm in diameter to 145° C., and after another 20 minutes to 170° C., during 30 minutes. The polymer thus obtained is practically free of monomeric caprylolactam, has high molecular weight and a reduced crystallinity as compared with the polymer prepared without an addition of magnesium salt.

EXAMPLE 3

At a temperature of 75° C., 0.025 g of sodium enantholactam are dissolved in 8.1 g of anhydrous enantholactam. 0.35 g of barium capronate and 0.032 g of N-butyrylenantholactam are then added to this solution. The polymerization mixture is then heated to 185° C. during 35 minutes and cooled slowly to room temperature. The polymer obtained contains less than 1 percent of monomeric enantholactam, and its crystallinity varies around 30 percent.

EXAMPLE 4

In 15.3 g of anhydrous pyrrolidone, 0.032 g of sodium hydride is dissolved at 35° C., 0.88 g of cobaltous chloride is added to the solution, and the mixture is then heated to 55°–60 C. The polymerisate thus obtained has a crystallinity below 40 percent, whereas its crystallinity without salt addition is 55 percent.

We claim:

1. In a method for the preparation of a polymer having a reduced crystallinity by the anionic polymerization of a lactam having a $C_{4-12}$ ring size in which the polymerization is conducted in the presence of a base catalyst, the improvement comprising adding to the lactam prior to polymerization a salt of a heat-stable anion selected from the group consisting of chloride, fluoride, bromide and sulphate, and a polyvalent cation selected from the group consisting of $Ba^{2+}$, $Mn^{2+}$, $Mn^{4+}$, $Co^{2+}$, $Co^{3+}$, $Cd^{2+}$, $Cr^{3+}$, $Al^{3+}$, $Fe^{2+}$, and $Fe^{3+}$.

2. A method according to claim 1 wherein the polymerization is conducted above the melting point of the monomer but below the melting point of the polymer.

3. A method according to claim 1 wherein the salts are introduced in an amount between about 0.05 and 10 molecule percent.

4. A method according to claim 3 wherein the salts are introduced in an amount of about 1 molecule percent.

* * * * *

United States Patent
Sebenda et al.

[15] 3,673,161
[45] June 27, 1972

[54] PREPARATION OF POLYMERS OF LACTAMS WITH REDUCED CRYSTALLINITY

[72] Inventors: Jan Sebenda, Stresnice Pionyru 1709; Rudolf Puffr, Senetelska, both of Prague 6, Czechoslovakia

[22] Filed: March 17, 1970
[21] Appl. No.: 20,430

[52] U.S. Cl............................................260/78 L
[51] Int. Cl..............................................C08g 20/18
[58] Field of Search.......................260/78 L, 78 P

[56] References Cited

UNITED STATES PATENTS

| | | | |
|---|---|---|---|
| 2,884,414 | 4/1959 | Indest et al. | 260/239.3 |
| 3,214,414 | 10/1965 | Waltersperger | 260/78 L |
| 3,216,976 | 11/1965 | Schwartz et al. | 260/78 L |

*Primary Examiner*—William H. Short
*Assistant Examiner*—L. M. Phynes
*Attorney*—Synnestvedt & Lechner

[57] ABSTRACT

Lactam polymers of reduced crystallinity are prepared by incorporating the salts of certain polyvalent cations.

4 Claims, No Drawings